United States Patent
Oono et al.

[11] Patent Number: 5,966,550
[45] Date of Patent: Oct. 12, 1999

[54] AUTOMATIC FOCUSING APPARATUS IN A CAMERA

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 09/028,253

[22] Filed: Feb. 23, 1998

[30] Foreign Application Priority Data

Feb. 24, 1997 [JP] Japan ..................................... 9-039414

[51] Int. Cl.$^6$ ............................. G03B 7/095; G03B 13/36
[52] U.S. Cl. ............................. 396/82; 396/104; 396/257
[58] Field of Search .................................. 396/79–82, 72, 396/85, 86, 87, 103, 104, 257; 348/347, 358, 64

[56] References Cited

U.S. PATENT DOCUMENTS

| | | |
|---|---|---|
| 4,043,642 | 8/1977 | Hirose et al. ........................ 396/85 X |
| 4,247,187 | 1/1981 | Tamura ................................... 396/104 |
| 4,465,352 | 8/1984 | Hirobe et al. ............................. 396/90 |
| 4,697,891 | 10/1987 | Kawai ...................................... 396/80 |
| 4,743,931 | 5/1988 | Matsuzaki et al. ........................ 396/90 |
| 4,953,029 | 8/1990 | Morimoto et al. .................... 348/64 X |
| 4,969,006 | 11/1990 | Ishibashi et al. ....................... 396/104 |
| 5,570,155 | 10/1996 | Shibayama ............................... 396/82 |

FOREIGN PATENT DOCUMENTS

| | | |
|---|---|---|
| 62-215248 | 9/1987 | Japan . |
| 63-10136 | 1/1988 | Japan . |

*Primary Examiner*—W. B. Perkey
*Attorney, Agent, or Firm*—Greenblum & Bernstein, P.L.C.

[57] ABSTRACT

An automatic focusing apparatus of a camera includes a photographing lens having a focusing lens group and a focus control mechanism which moves the focusing lens group to a hyper-focal distance position when no effective object distance is obtained.

15 Claims, 9 Drawing Sheets

AUTOMATIC FOCUSING APPARATUS IN A CAMERA

BACKGROUND OF THE INVENTION

1. Field of the Invention

The present invention relates to an automatic focusing apparatus in a camera.

2. Description of the Related Art

In recent digital still cameras (digital cameras), object images are recorded as electric digital image data. In the digital cameras, a CCD image pickup device (CCD image sensor) is employed in place of a silver-halide film.

Conventional compact digital still cameras are provided with a unifocal or bifocal photographing lens. In general, the light receiving surface area of the CCD image pickup device is smaller than that of the camera using the silver-halide film. Consequently, the focal length of the photographing lens of a digital camera is shorter than that of the camera using the silver-halide camera for the same angle of view, and hence the depth-of-field (focal depth) of the digital still camera is greater than that of the camera using the silver-halide camera. Therefore, a pan-focus can be obtained by the wide-angle unifocal lens.

To make it possible for a digital camera to carry out macro-photographing, an object in a distance range from a few centimeters (near point) from the digital camera to the infinite distance (far point) must be accommodated in the depth-of-field. To this end, the f-number of the photographing lens must be considerably increased and the focal length thereof must be considerably decreased. This is impractical. If the photographing lens is made of a zoom lens, the depth-of-field (focal depth) at the long focal length is small, and hence an automatic focusing apparatus is needed.

However, in conventional automatic focusing apparatuses, there are times when, depending on the conditions of the object, it is impossible to focus correctly, as is well known. There has been a need for an automatic focusing apparatus in which the automatic focus control can be executed for almost all object distance conditions, or where no or little images that are out-of-focus are formed.

It is an object of the present invention to provide an automatic focusing apparatus of a camera in which the distance range of an object on which the photographing lens can be focused even under the conditions that no automatic focusing operation is available can be expanded or the probability of a formation of an object image that is out-of-focus can be reduced.

SUMMARY OF THE INVENTION

To achieve the object mentioned above, according to an aspect of the present invention, there is provided an automatic focusing apparatus of a camera comprising a photographing lens having a focusing lens group and a focus control means for moving the focusing lens group to a hyper-focal distance position when no effective object distance is obtained.

With this structure, even under the conditions that no automatic focusing operation is available, the photographing lens can be focused on any objects which are within the distance range from the hyper-focal distance to the infinite distance.

If the photographing lens is a zoom lens, the hyper-focal distance is determined in accordance with the focal length which varies during the zooming operation and the diaphragm value of the zoom lens.

Preferably, provision is made of a means for reducing a diaphragm aperture when no effective object distance is detected. Consequently, the depth-of-field can be increased, so that a closer object can be made in-focus.

The present disclosure relates to subject matter contained in Japanese patent application No. 09-39414 (filed on Feb. 24, 1997) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

The illustrated embodiment is applied to a digital camera having a power zoom lens. The digital camera includes a zoom lens portion having a power zoom photographing lens and a CCD image pickup device, and a camera portion having an image recorder, such as a memory card and a color liquid crystal display.

Figure 1:
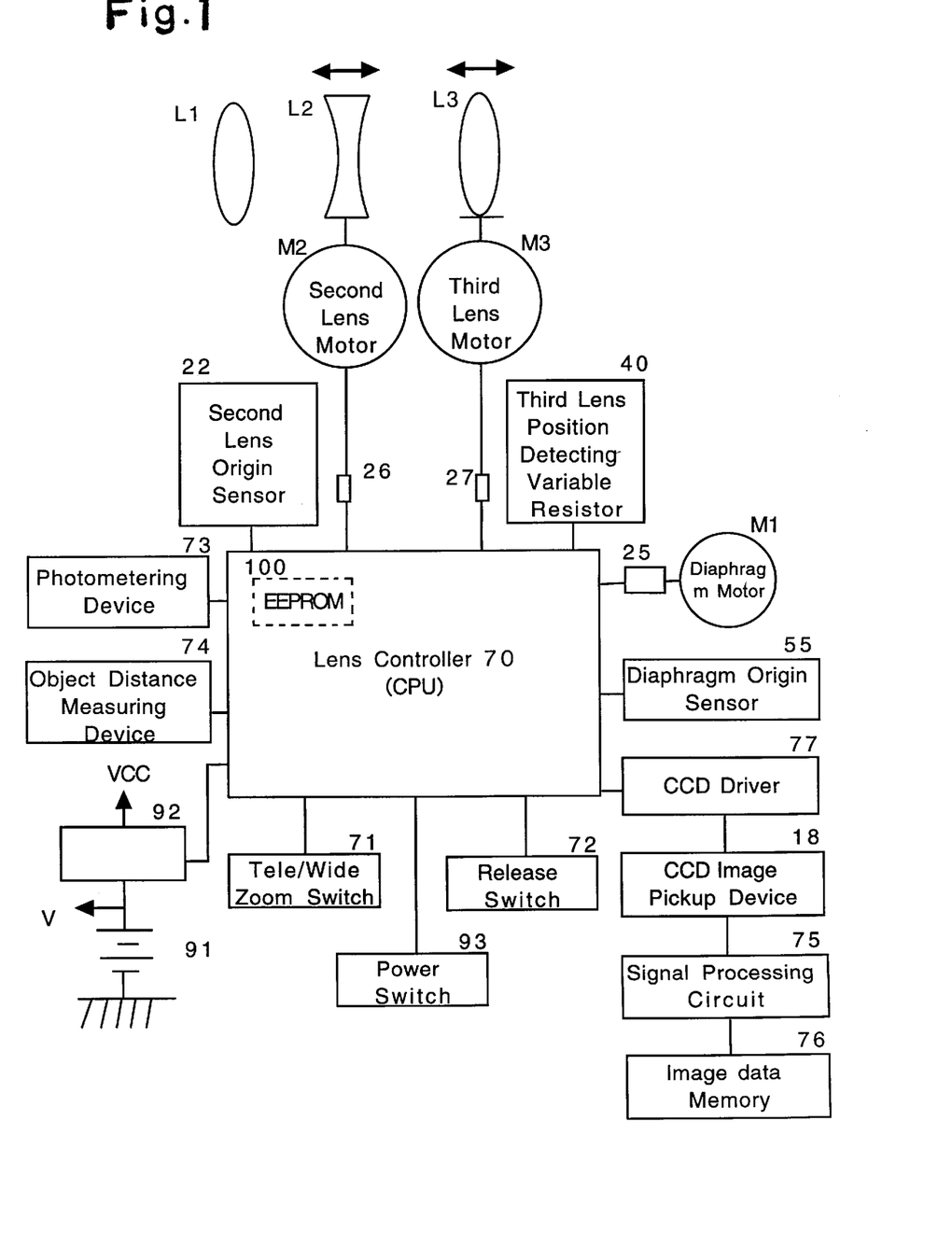
FIG. 1 is a block diagram of a digital still camera to which the present invention is applied.

The lens control system provided in the zoom lens portion will be explained below with reference to FIG. 1. Connected to the lens controller (CPU) 70 is a diaphragm stepping motor (first motor) M1 for driving the diaphragm, a second lens stepping motor (second motor) M2 for driving the second lens group L2 of the zoom lens, and a third lens motor (third motor) M3 for driving the third lens group L3 of the zoom lens through motor drivers 25, 26 and 27, respectively.

Moreover, connected to the lens controller 70 is a second lens group initial-position sensor 22 for detecting the origin of the second lens group L2, a third lens variable resistor 40 for detecting the absolute position of the third lens group L3, a diaphragm initial position sensor 55 for detecting the initial position (full-open position) of the diaphragm, a color image pick-up device (CCD) 18, a zoom switch 71 having a tele-switch and/or wide-switch, a release switch 72, a photometering device 73 for measuring the object brightness, and an object distance measuring device 74. The photometering device 73 usually constitutes the CCD 18, but is shown as a separate member for clarity. The object distance measuring device 74 can be either a passive type or an active type. If the object distance measuring device 74 is of a passive type, the object light is split into two bundles of rays to form a pair of object images on a pair of areas of the line sensor, so that the amount of defocus or the object distance can be obtained in accordance with the phase difference (distance) between the object images. In the illustrated embodiment, the passive type photometering device 73 is employed wherein the object distance is detected.

The CCD image pickup device 18 is driven by a CCD driver 77 and converts an optical object image formed thereon into an electrical image signal which is transmitted to the signal processing circuit 75. The signal processing circuit 75 converts the electrical image signal input thereto into digital image data which is recorded in an image-data memory 76. A built-in flash memory or a detachable memory card, can be used as a recording medium for the image-data memory 76.

A battery 91 which supplies electric power to the electronic devices mentioned above is provided in the camera body, so that when the power switch 93 is turned ON, the power is supplied to the electronic devices of the zoom lens portion directly or through a regulator 92. For clarity, it is assumed that these devices are provided in the zoom lens and that the power switch 93 is connected to the controller 70, so that when the latter is turned ON, the power can be supplied to the electronic devices through the regulator 92. The power switch 93 functions also as a photographing mode switch which is adapted to pick-up an image when the release switch 72 is turned ON and to record the digital image signals in the image-data memory 76.

In the illustrated embodiment, the zoom lens is composed of a first positive stationary lens group L1, a second negative movable lens group L2 and a third positive movable lens group L3. This lens system is of a variable focus type in which the zooming operation is carried out by moving the second and third lens groups L2 and L3 and the focusing operation is carried out by moving the second lens group L2. However, no cam groove is used to control the relative position of the second and third lens groups L2 and L3. The positions of the second lens group L2 and the third lens group L3 are controlled in an open loop and a closed loop, respectively, in accordance with the set focal length data (position data of the second lens group L2) and the object distance data (object distance). Note that, for clarity, in the illustrated embodiment, the second lens group L2 is referred to as a focusing lens group; the second lens stepping motor M2 is referred to as a focusing motor; the third lens group L3 is referred to as a zoom lens group; and the third lens motor M3 is referred to as a zoom motor.

According to one of the significant features of the illustrated embodiment, the second lens group L2 is moved to a hyper-focal distance position (in which the object of the hyper-focal distance is in focus) if no effective measurement is obtained by the object distance measuring device 74. No effective measurement can be obtained by the passive type object distance measuring device 74 in which the object light is split into two bundles of rays which are received by the CCD line sensor, so that the amount of defocus or the object distance can be detected in accordance with the phase difference between a pair of object images, for example, if the object is too dark, the contrast of the object (e.g., white wall) is low, the object has a continuous repetitive pattern as in a lattice, or there are a plurality of far and near distant objects, etc.

The hyper-focal distance H can be determined by the following equation.

$H$=(focal length of the photographing lens)$^2$/(diameter of allowable blur)×(used stop f-number)

The diameter of an allowable blur is predetermined as a fixed value. Alternatively, it is possible to set a plurality of fixed values which can be selectively used by the photographer depending on the photographing mode. For example, a small value is selected at a high definition photographing mode and a large value is selected at a snap-photographing mode.

The depth-of-field of the photographing lens increases as the diaphragm aperture is reduced or the focal length is reduced. Therefore, in an embodiment of the present invention, if no effective object distance is obtained, the second lens group L2 is moved to the hyper-focal distance position and a further stop-down operation is carried out.

In the illustrated embodiment, the origin (original position) of the second lens group L2 is an infinite focal position. The second lens group L2 is moved so that the infinite focal position is maintained during the zooming operation.

In another embodiment of the present invention, the second lens group L2 is normally located (e.g., at a default position) at the hyper-focal distance position corresponding to the current focal length and open f-number. Upon zooming, the second lens group L2 is moved to the hyper-focal distance position corresponding to the focal length which has been varied.

The photometering operation, the measurement of the object distance and the movement of the lens group are carried out when the power switch is turned ON or the half depression of the release button takes place. In a modified embodiment, the photometering operation and the measurement of the object distance are carried out when the half depression of the release button takes place, and the second lens group L2 is moved to the focal position in accordance with the set object distance obtained by the measurement of the object distance and the set focal length when the release button is depressed by full step.

Figure 2:
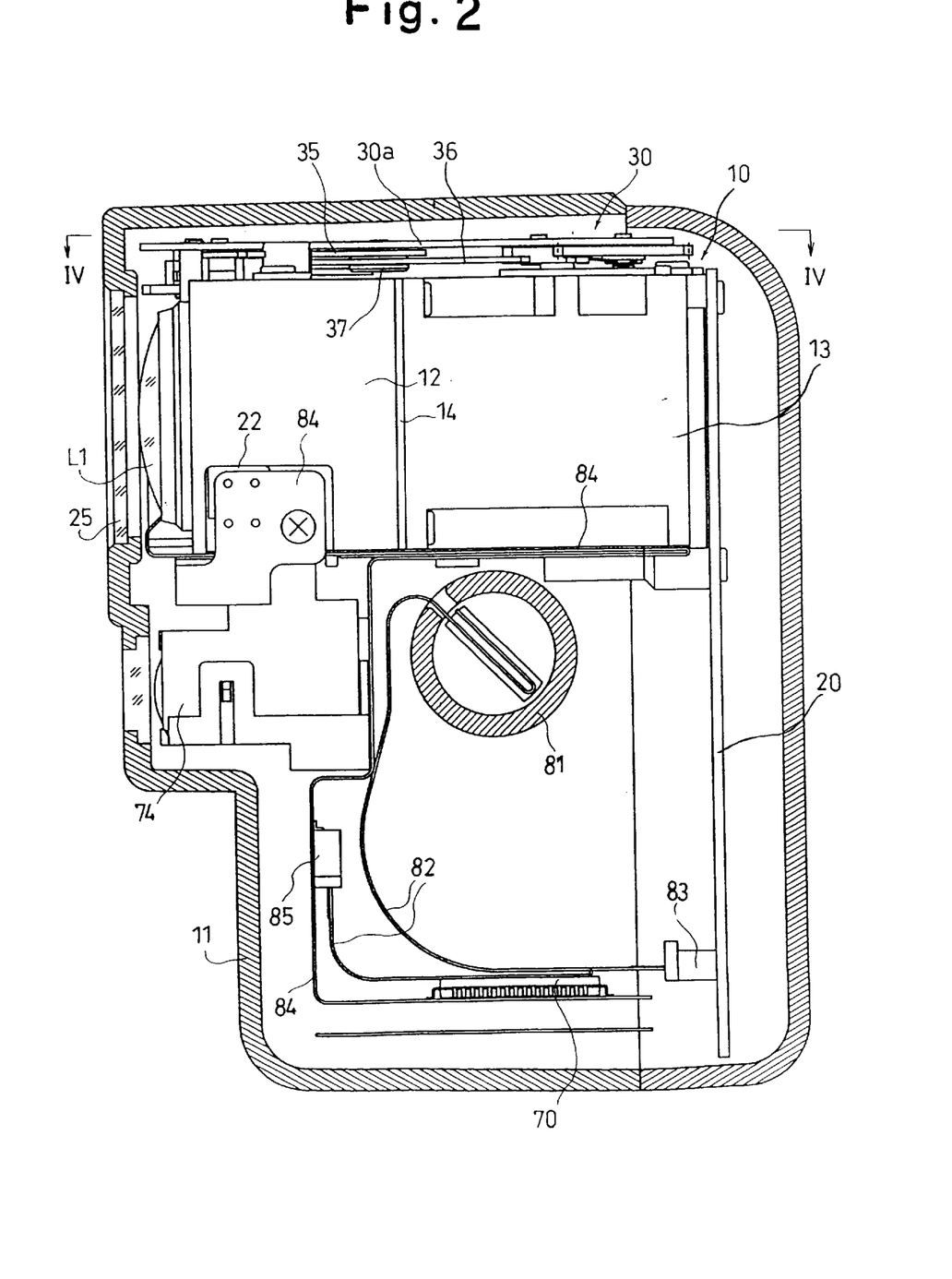
FIG. 2 is a left side view of a zoom lens portion in which the casing is sectioned.
Figure 5:
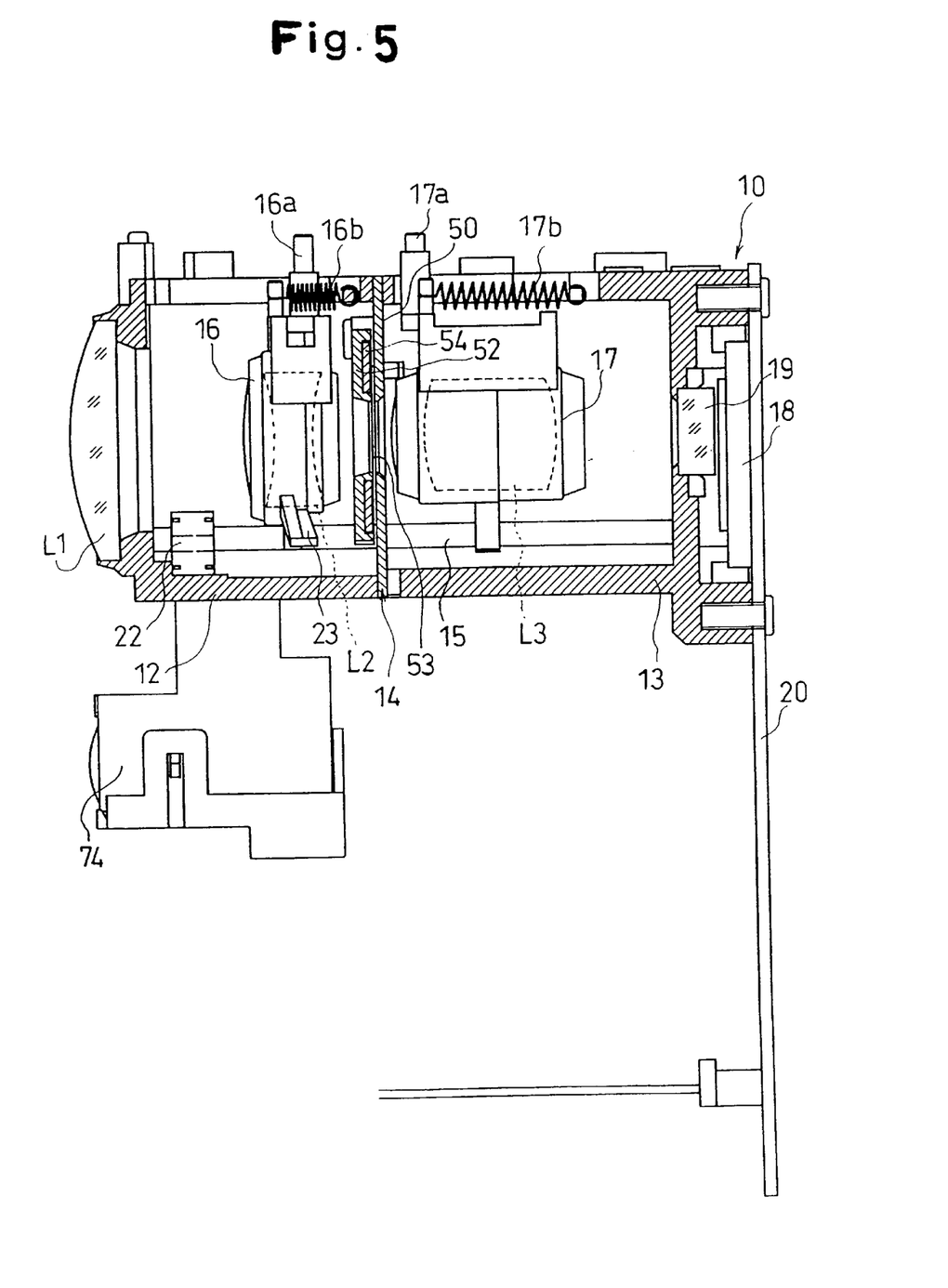
FIG. 5 is a partially longitudinally sectioned left side view of a lens unit before a lens drive unit is incorporated, shown in a telephoto position.

The mechanical structure of the zoom lens to which the present invention is applied will be explained below. The lens barrel body 10 provided in the lens casing 11 is essentially composed of a front plastic body 12, a rear plastic body 13 and a diaphragm block 14 held between the front and rear plastic bodies 12 and 13. There are a plurality of guide rods 15 (only one of which is shown in FIG. 5) which extend in parallel with the optical axis and by which a second lens frame 16 which holds the second lens group L2 and a third lens frame 17 which holds the third lens group L3 are movably guided. The CCD 18 is located behind the third lens frame 17 and is secured to the rear body 13 through the substrate 20 thereof. 19 designates the crystal filter. The casing 11 is provided with a glass cover (plane-parallel plate) 25 (FIGS. 2 and 3) secured thereto and located in front of the first lens group L1.

The second lens frame 16 and the third lens frame 17 are respectively provided with upwardly extending second and third lens pins 16a and 17a. The second and third lens frames 16 and 17 are biased rearward (toward the CCD 18) by tensile springs 16b and 17b for removing backlash.

The front body 12 is provided with a photodetector (initial position sensor) 22 to detect the origin of the second lens frame 16 (second lens group L2). The second lens frame 16 is equipped with a tab plate 23 secured thereto to cooperate with the photodetector 22. In the illustrated embodiment, the origin of the second lens group L2 corresponds to an infinite object distance at the wide-angle extremity. When the second lens group L2 is located at the origin, the tab plate 23 interrupts the light from the photodetector 22 to detect the origin. The movement of the second lens group L2 from the origin is controlled by the lens controller 70 in accordance with the number of pulses for driving the second lens group L2. Alternatively, it is also possible to control the movement of the second lens group L2 from the origin using a pulser.

As may be supposed from the telephoto position shown in FIG. 5, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved always in opposite directions.

The drive mechanism which drives the second lens frame 16 and the third lens frame 17 within the lens barrel body 10 is assembled as a lens drive unit 30 and is mounted to bridge the front body 12 and the rear body 13. The second lens stepping motor M2 and the third lens stepping motor M3 are secured to the lower surface of the second mother plate (substrate) 32 so that the output shafts of the stepping motors M2 and M3 extend perpendicularly to the second substrate 32. The second drive plate 35 which is provided with a cam groove (lead groove), in which the second lens pin 16a of the second lens frame 16 is fitted, and a third drive plate 36 which is provided with a cam groove (lead groove), in which the third lens pin 17a of the third lens frame 17 is fitted, are coaxially pivoted to the first substrate 31 by a common shaft 37. The second lens pin 16a and the third lens pin 17a are always in contact with the surface of the rear side of the cam groove (adjacent the CCD image pickup device 18) through the tensile springs 16b and 17b, respectively, to eliminate backlash.

There is a gear mechanism 38 which transmits the rotation of the second lens stepping motor M2 to the second lens drive plate 35, a gear mechanism 39 which transmits the rotation of the third lens stepping motor M3 to the third lens drive plate 36, and a volume mechanism (variable resistor) associated with the third lens drive plate 36, between the first and second mother plates 31 and 32. The lens controller 70 receives the resistance of the volume mechanism and converts the same into position data of the third lens group L3.

Figure 3:
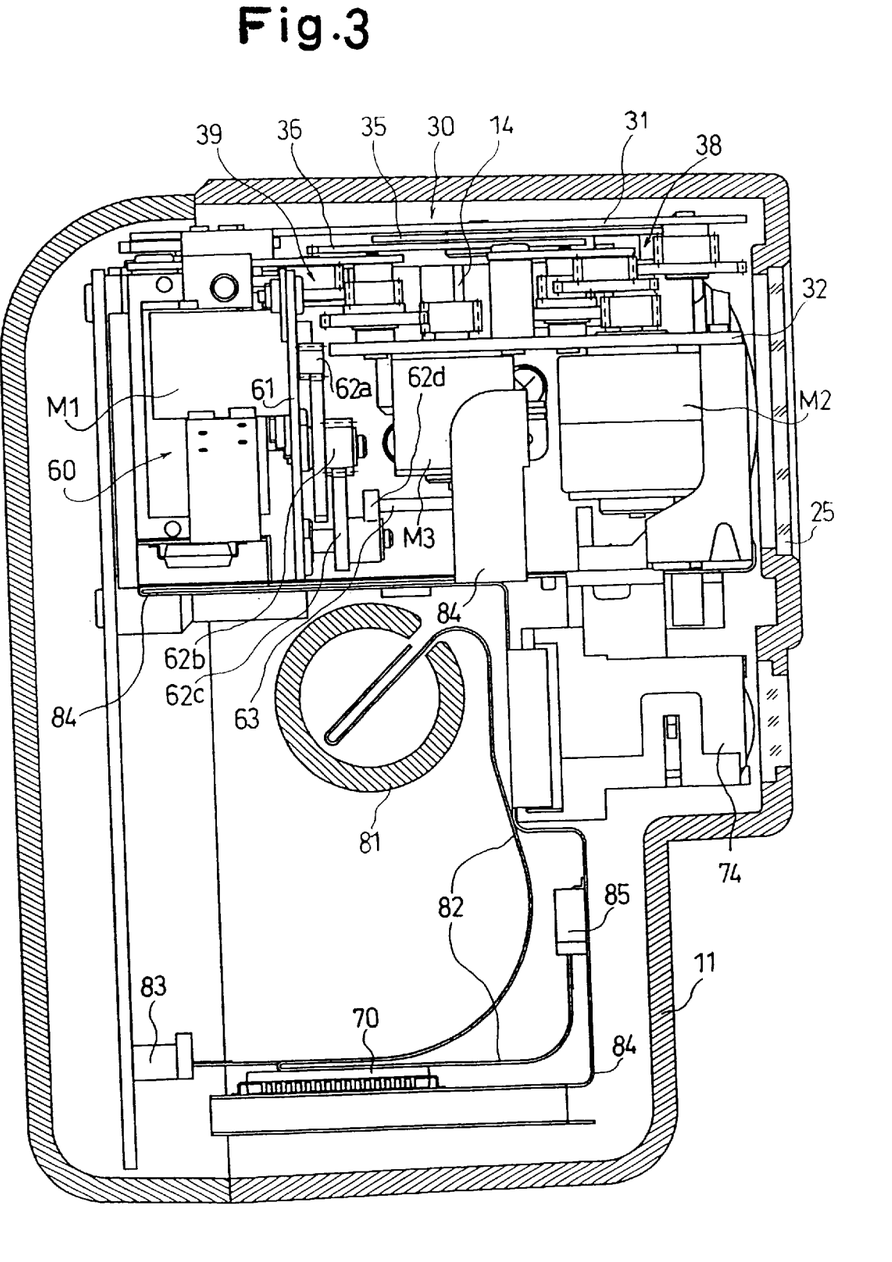
FIG. 3 is a right side view of a zoom lens portion of FIG. 2.
Figure 4:
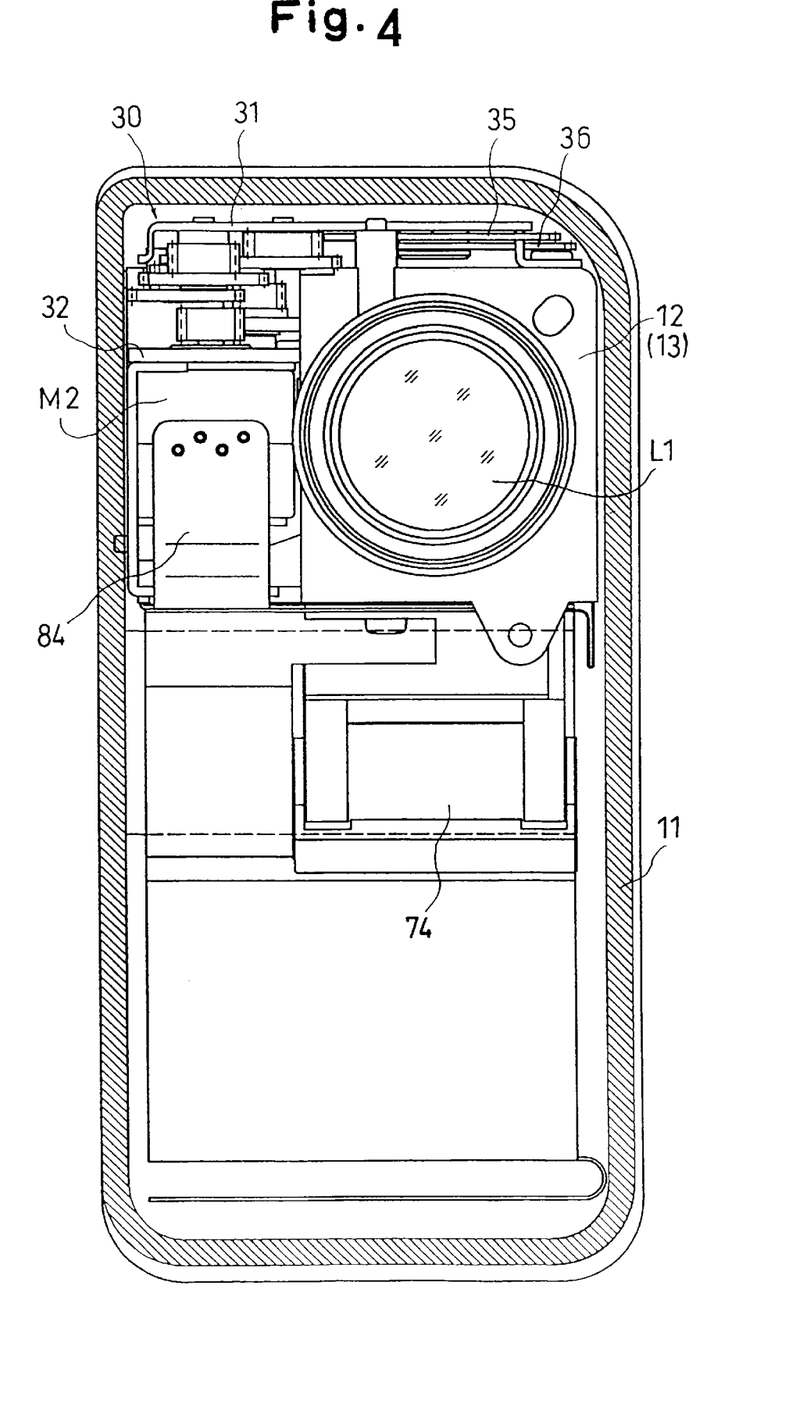
FIG. 4 is a front elevational view of a zoom lens portion of FIG. 2.

In FIG. 3, numeral 60 designates a diaphragm drive unit which drives the diaphragm block 14 held between the front body 12 and the rear body 13. The diaphragm block 14 is secured between the first and second bodies 12 and 13 through the substrate 50. The diaphragm block 14 is provided with a retainer 52 secured to the substrate 50, diaphragm blades 53, an aperture stop 54 which opens or closes the diaphragm blades 53, and a photosensor (not shown) as a position detector which detects the position of the origin (full-open position) of the diaphragm blades 53. The lens controller 70 detects the original position of the diaphragm block 14 (diaphragm mechanism) through the photosensor.

The diaphragm drive unit 60 forms a separate unit which is secured to the rear body 13 at positions different from the diaphragm block 14 in the optical axis direction and the radial direction. The diaphragm stepping motor M1 is secured to the substrate 61 of the drive unit 60. The first gear 62a of the drive shaft thereof is functionally connected to the sector gear 62c through the second gear 62b. The sector gear 62c is provided with a radial arm integral therewith, which is in turn provided with an association pin 63 which is fitted in the radial groove of the aperture stop 54. Namely, when the diaphragm stepping motor M1 rotates so that the radial arm 62d is rotated, the aperture stop 54 is rotated to open or close the diaphragm blades 53. The diaphragm stepping motor M1 is stopped at the detent position.

The lens casing 11 is connected to the body casing (not shown) through the cylindrical boss 81 (FIGS. 2 and 3) at a substantially center portion so as to rotate by an angle less than 360°. The body casing is equipped with the zoom switch, the release switch, the signal processing circuit, the memory, a liquid crystal display (LCD) panel with a finder function, in which the object image formed on the CCD 18 is displayed, a body CPU, and various function switches. The electric circuits in the body casing are connected to the electric circuits in the lens casing 11 through a body-lens connecting FPC board 82 which extends through the cylindrical boss 81. Namely, the FPC board 82 connected to the CPU within the body casing is connected to a connector 83 provided on the substrate 20 and a connector 85 provided on an FPC board 84 on the lens side, through the cylindrical boss 81. The FPC board 84 on the lens side is provided with a printed circuit to which all the electrical elements within the casing 11 are connected and electronic devices such as the lens CPU 70.

The focal position of the zoom lens, i.e., the position of the second lens group L2 is can be definitely determined in accordance with the position of the third lens group L3 (set focal length) and the object distance measured by the focusing device 74.

The position of the second lens group L2 (number of the drive pulses of the second lens stepping motor from its initial position) determined in accordance with the focal length and the object distance is obtained in advance by calculation or by measurement and is shown in a table stored for example in an EEPROM. The stored data can be read upon photographing, so that the position of the second lens group L2, i.e., the number of the drive pulses from the initial position, can be set.

The relationship between the appropriate diaphragm values based on the measurements obtained by the photometering device 73 and the number of the drive pulses of the diaphragm stepping motor M1 is shown in a table. The number of the drive pulses can be read and set from the table upon driving the diaphragm stepping motor M1.

The hyper-focal distance of the zoom lens systems L1, L2 and L3 is determined in accordance with the set focal length, the diaphragm values, and the appropriate diaphragm values (f-number or Apex-reduced diaphragm values Av) measured and set by the photometering device 73.

Upon photographing, the data shown on the table stored in EEPROM is read and the f-number determined using the table is compared with the appropriate f-number (diaphragm value) to judge whether or not the focal depth is above a predetermined value (whether the appropriate f-number is greater) under the conditions mentioned above.

Figure 6:
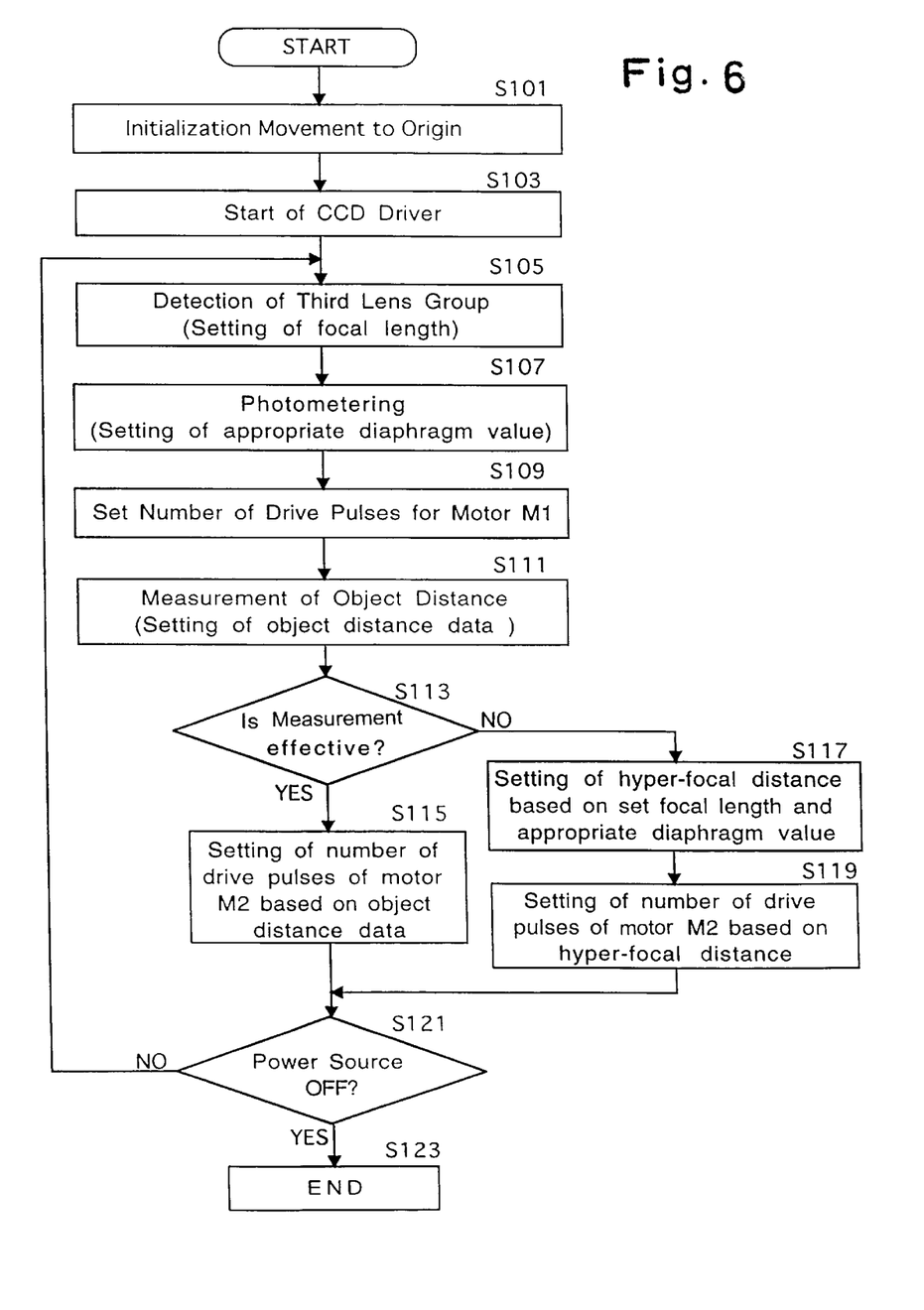
FIG. 6 is a flow chart of the basic operation of a digital still camera to which the present invention is applied.

The lens controller 70 operates as follows. FIG. 6 shows a flow chart of the operation of an embodiment in which the photometering operation and the focusing operation are repeatedly carried out when the power switch 93 is ON. In this embodiment, while the power switch is ON, the motors M1 and M2 are driven at even-numbered stepped angular-units in accordance with the normal drive control, and if the release switch 72 is depressed by half a step, the motors M1 and M2 are driven by one-step angular units, in accordance with the high precision drive control. In the illustrated embodiment, when the release switch 72 is depressed by a full step, the image data is written in the image-data memory 76.

When the power switch is turned ON (photographing mode is set), the lens controller 70 initializes the internal RAM, to drive the motors M1, M2 and M3. Consequently, the diaphragm blades 53 are opened to the initial position (open position) and the second and third lens groups L2 and L3 are moved to the origin (initial position). The movement of the motors M1, M2 and M3 is stopped at the detent position (1-phase excitation position) (S101). Thereafter, the image pickup operation by the CCD image pickup device 18 is carried out by the CCD driver 77 (S103). In the illustrated embodiment, the CCD driver 77, once driven, continues the image pickup operation until it receives a stop signal or the power supply is stopped.

The absolute position of the third lens group L3 is detected through the third lens variable resistor 40 to set the focal length (S105). Thereafter, the photometering device 73 is actuated to measure the object brightness, and the appropriate diaphragm value (f-number) is set in accordance with the object brightness and the set focal length (S107). Thereafter, the diaphragm value (f-number) at which the appropriate quantity of exposure light can be obtained is determined in accordance with the appropriate diaphragm value. The number of the drive pulses for driving the diaphragm stepping motor M1 to move the diaphragm from the origin is obtained and set as a set M1 value (S109). Thereafter, the object distance measuring device 74 is actuated to detect and set the object distance (S111). If no effective object distance is obtained, the measurement becomes ineffective and no object distance is set.

A check is made to determine whether or not the measurement of the object distance is effective. If the measurement is effective, the number of the drive pulses of the second lens stepping motor M2 is obtained and set as a set M2 value in accordance with the set focal length and the set object distance (S113; Yes, S115). If the measurement is ineffective, the hyper-focal distance is obtained in accordance with the set focal length and the set diaphragm value (appropriate f-number) (S113; No, S117). Consequently, the number of the drive pulses for the second lens stepping motor M2 is determined and set as a set Me value in accordance with the obtained hyper-focal distance (S119).

The above-mentioned operations (S105 to S121) are repeated until the power switch is turned OFF (S121; No, S105–S121). Consequently, if the effective object distance is obtained, the number of the drive pulses of the second lens stepping motor M2 necessary to focus on the corresponding object is set as a set M2 value. If no effective object distance is obtained, the number of the drive pulses of the second lens stepping motor M2 corresponding to the hyper-focal distance at the set focal length and the set diaphragm value is obtained.

If the power source is turned OFF, the termination operation is performed and the control ends (S121, Yes; S123. The termination operation includes at least the power-OFF operation and the termination operation of the CCD driver 77 and can include the movement of the motors M1, M2 and M3 to the respective initial positions (origins).

Figure 7:
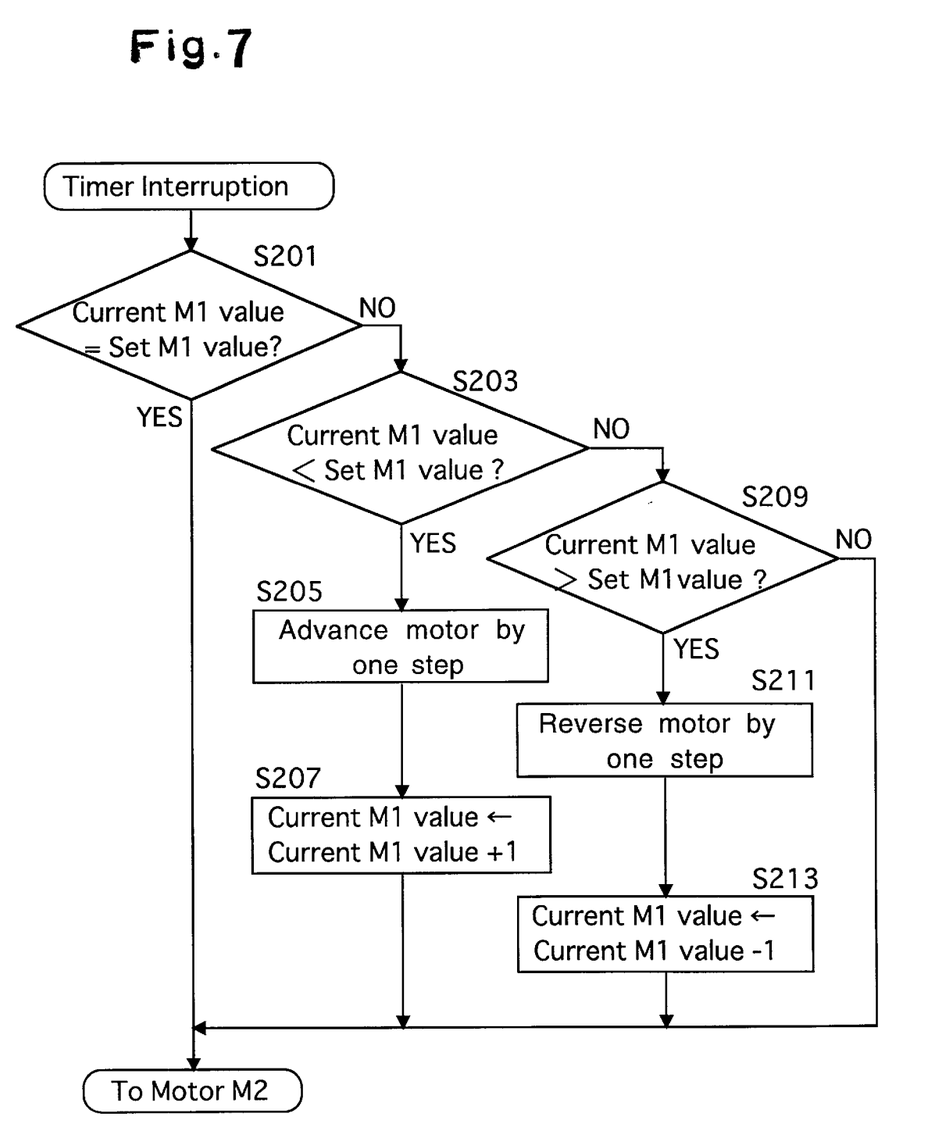
FIG. 7 is a flow chart of a stepping motor driving operation in a digital still camera to which the present invention is applied.
Figure 8:
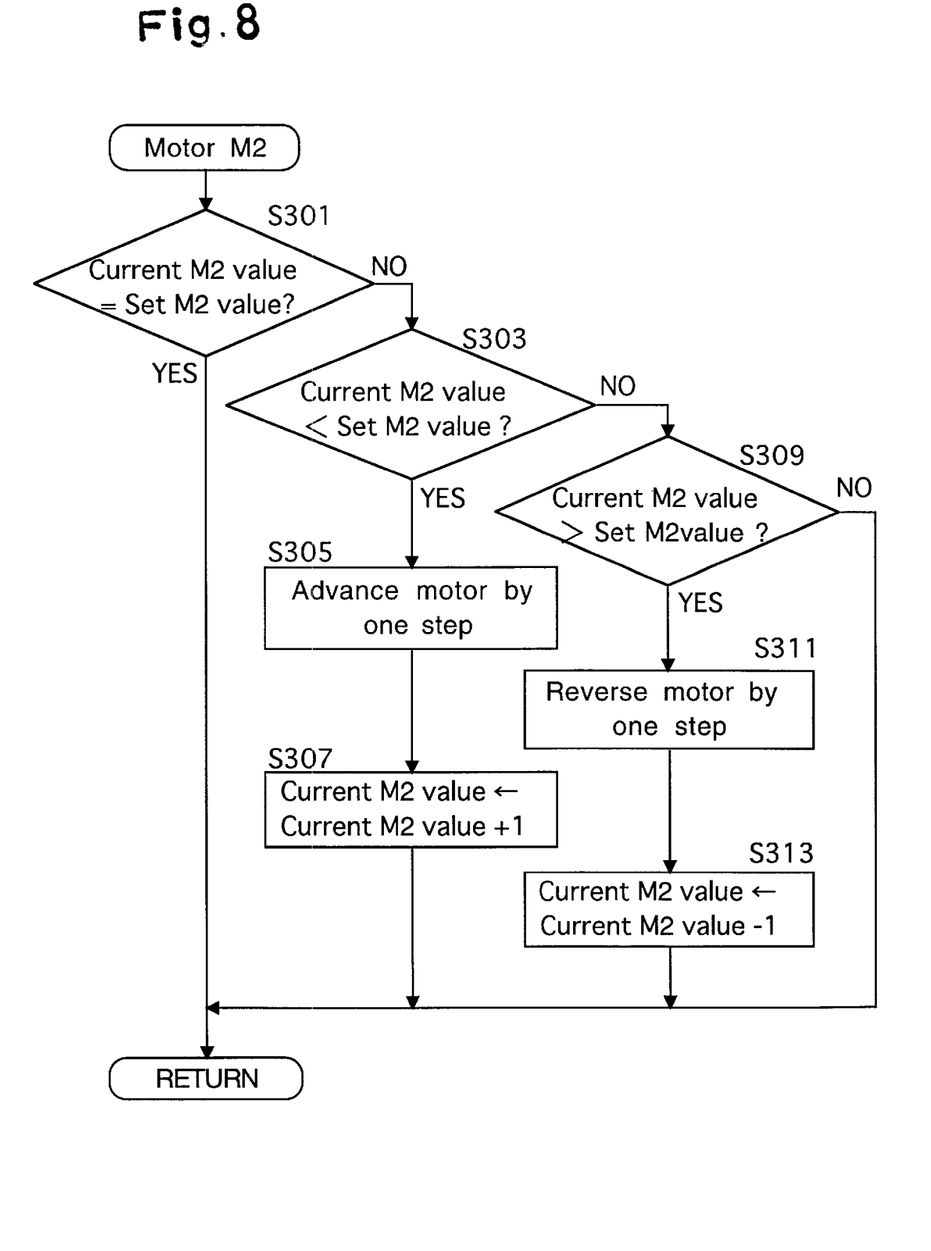
FIG. 8 is a flow chart of a stepping motor driving operation in a digital still camera to which the present invention is applied.

If the control is timer-interrupted during the operations mentioned above, the motors M1 and M2 are driven as shown in the flow charts of FIGS. 7 and 8. The current M1 and M2 values represent the number of the drive pulses used to drive the motors M1 and M2 from the initial positions.

If a timer-interruption occurs, a comparison is made to compare the current M1 value (number of the drive pulses of the diaphragm stepping motor M1) with the set M1 value (S201). If the current M1 value is less than the set M1 value, the diaphragm stepping motor M1 is driven by +1 (a forward step) to increase the current M1 value by one (S201, No; S203, Yes; S205; S207). If the current M1 value is greater than the set M1 value, the diaphragm stepping motor M1 is driven by −1 (a reverse step) to decrease the current M1 value by one (S201, No; S203, No; S209, Yes; S211; S213). If the current M1 value is equal to the set M1 value, no drive is necessary and hence, the control proceeds to the operations for the motor M2 (S201; Yes).

When the motor M2 driving operation occurs, a comparison is made to compare the current M2 value (number of the drive pulses of the second lens stepping motor M2) with the set M2 value (S301). If the current M2 value is less than the set M2 value, the second lens stepping motor M2 is driven by +1 (a forward step) to increase the current M2 value by one (S301, No; S303, Yes; S305; S307). If the current M2 value is greater than the set M2 value, the second lens stepping motor M2 is driven by −1 (a reverse step) to decrease the current M2 value by one (S301, No; S303, No; S309, Yes; S311; S313).

If the current M2 value is identical to the set M2 value, no drive is necessary and hence, the control is returned (S301, Yes).

Although the diaphragm stepping motor M1 is driven prior to the second lens stepping motor M2 in the timer-interruption operation mentioned above, it is possible to drive the second lens stepping motor M2 prior to the operation of the diaphragm stepping motor M1.

The lens controller 70 performs the interruption operation to step-drive the motors M2 and M3 when the zoom switch 71 is depressed during the repetition of the above mentioned operations. The motor drive operation upon zooming will be discussed below. In the telephoto position shown in FIG. 5, if the zoom switch 71 is moved toward the wide angle position, the lens controller 70 drives the second and third lens stepping motors M2 and M3 at one-step angular units as a result of the interruption operation to thereby move the second and third lens frames 16 and 17 (second and third lens groups L2 and L3) forward and rearward, respectively. The lens controller 70 decreases the current M2 and M3 values by one every time the motors M2 and M3 are driven by a one-step angular unit. The lens controller 70 stops the motors M2 and M3 when the zoom switch 71 is turned OFF, i.e., when the lens controller 70 receives the stop signal.

If the zoom switch 71 is moved in the telephoto direction, the lens controller 70 drives the second and third lens stepping motors M2 and M3 at a one-step angular unit to move the second and third lens frames 16 and 17 (second and third lens groups L2 and L3) rearward and forward, respectively, due to the interruption. The lens controller 70 increases the current M2 and M3 values by one every time the motors M2 and M3 are driven by a one-step angular unit. When the second or third lens frame 16 or 17 reaches the telephoto extremity, or the zoom switch 71 is turned OFF, i.e., the lens controller receives the stop signal, the lens controller 70 stops the power supply to the second lens stepping motor M2 and the third lens stepping motor M3.

It should be noted that it is unnecessary to count the number of drive pulses for driving the third stepping motor M3 because the axial position of the third lens group L3 can be detected using the variable resistor 40.

The lens controller 70 controls each of the first and second stepping motors M1 and M2 in accordance with the focal-length set by the aforementioned zooming operation. The number of drive pulses for driving the first stepping motor M1 is determined and set in accordance with the object brightness information obtained through the photometering device 73, and the diaphragm sector blades 53 of the aperture stop 54 is driven to stop down from its initial position by the first stepping motor M1 in accordance with the set number of drive pulses for driving the first stepping motor M1.

Further, the number of drive pulses for driving the second stepping motor M2 is determined and set in accordance with the object distance information obtained through the object distance measuring device 74, and the second lens group L2 is driven to move from its initial position by the second stepping motor M2 in accordance with the set number of drive pulses for driving the second stepping motor M2 so as to bring an object into focus. Namely, when the position of the third lens group L3 is determined, that is, when the focal-length of the photographic lens system is determined by operating the zoom switch 71, the position of the second lens group L2 is determined in accordance with the set focal-length and the object distance information obtained by the object distance measuring device 74. Thus, an in-focus object image is formed on the CCD 18.

If no effective object distance is obtained, the number of the drive pulses of the second lens stepping motor M2 is set so as to focus at the hyper-focal distance determined in accordance with the diaphragm value and the focal length. Thus, for at least an object distant far from the hyper-focal distance, image data on an in-focus object can be recorded.

In the present embodiment, as mentioned above, the operations of the lens controller 70 shown in FIGS. 6 through 8 are performed on the condition that the power switch 93 is ON. However, for example, performing only the operation at step S101 is a possibility. In this case, when the zoom switch 71 is turned ON, the lens controller 70 performs the zooming operation by driving the second and third stepping motors M2 and M3 whereas the lens controller 70 does not yet perform the timer-interrupt process shown in FIGS. 7 and 8. When the release switch 72 is depressed by a full step, the image data is recorded in the image data recording device 76. The above-mentioned operations can include a judgement operation in which a check is made to determine whether the release switch 72 is depressed by half step, prior to the operation at S103, and if the half depression of the release switch occurs, the control proceeds to S103 and if the release switch is OFF, the checking operation of the release switch is repeated. In this case, the checking operation of the power source at step S121 is replaced an operation to check whether the release switch 72 is OFF.

In the above-mentioned embodiments, if no effective object distance is obtained, the hyper-focal distance is determined in accordance with the appropriate diaphragm value. Alternatively, it is possible to further reduce the diaphragm aperture to increase the depth-of-field to thereby enhance the probability that the object is in focus. Even if the object is out-of-focus, the blur of the object image is reduced.

Figure 9:
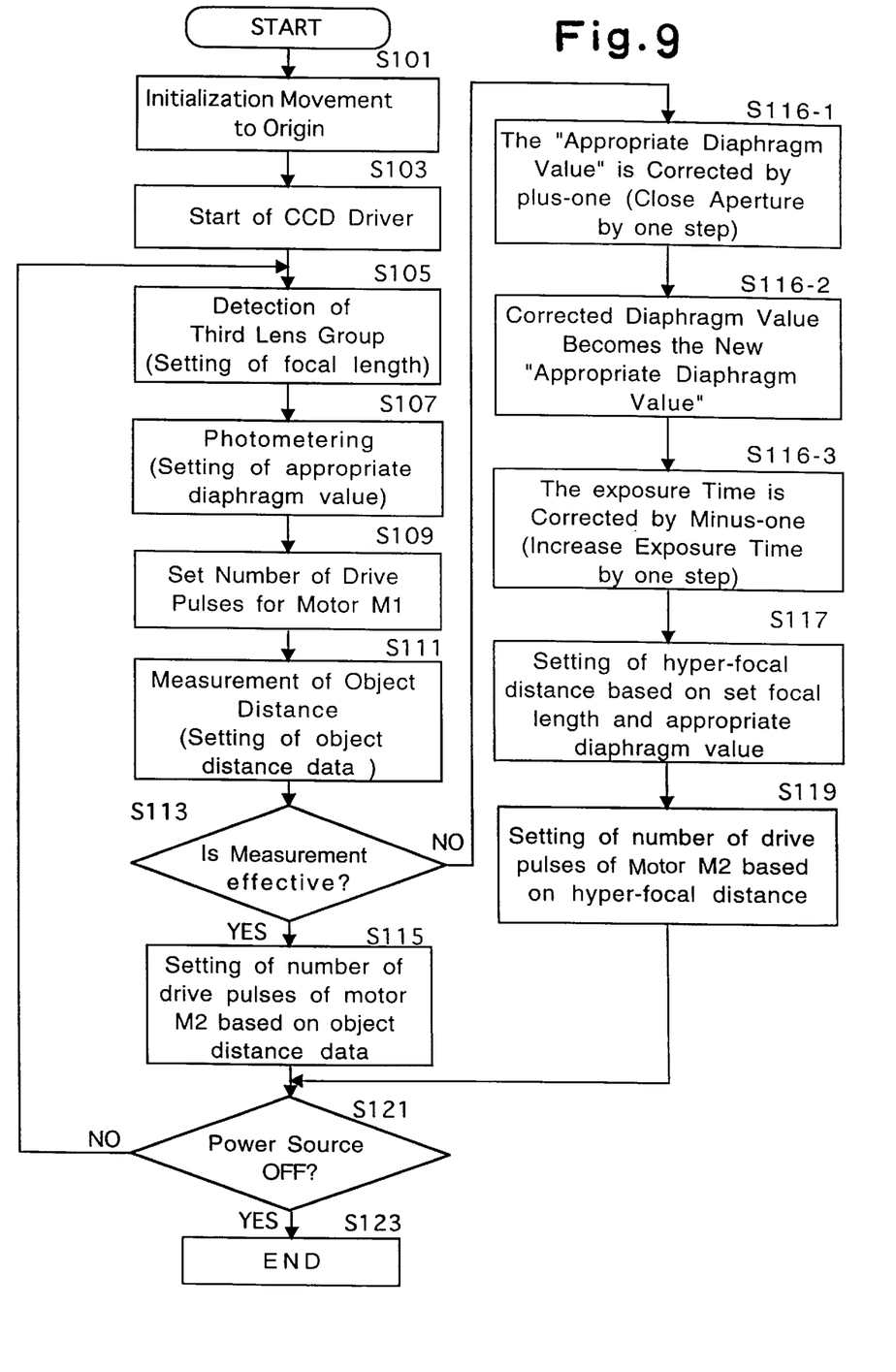
FIG. 9 is a flow chart of an another basic operation of a digital still camera to which the present invention is applied.

The closing of a diaphragm aperture in an embodiment will be discussed with reference to FIG. 9. This embodiment includes the steps S101 through S115 and steps S117 through S123 of FIG. 6, and hence, the explanation of these steps will be omitted in the following explanation.

If measurement result is determined to be ineffective at step S113, the appropriate diaphragm value that was set at step S107, via predetermined steps, is corrected by (as shown this embodiment) +1 Ev (S113, NO; S116-1 through S116-3). In other words, the diaphragm aperture is closed by one step. Hence, in accordance with the corrected diaphragm value, the exposure time is corrected by −1 Ev (S116-3). In other words, the exposure time is increased by one step.

Since the exposure time is corrected in accordance with the closing of the diaphragm aperture, an appropriate exposure value can be maintained and the depth-of-field can be increased, to thereby enhance the probability of the object being in focus.

In a modified embodiment of the present invention, the second lens group L2 is normally located at the hyper-focal distance or in the vicinity thereof. Namely, upon zooming, the focal length which is determined in accordance with the position of the third lens group L3 and the hyper-focal distance position at the f-number at the focal length thus determined are obtained by calculation or from the data table, and the position of the second lens stepping motor M2, i.e., the number of the drive pulses thereof is obtained by calculation or from the data table, so that the second lens stepping motor M2 can be driven accordingly.

Although the zoom lens portion having a photographing lens is separate from the camera body portion having an image data storing means in the illustrated embodiments, the present invention can be applied to a digital still camera in which the zoom lens portion and the camera body portion are integrally formed.

As can be understood from the above discussion, according to the present invention, if no effective object distance is obtained by the object distance measuring device, the focus control is carried out so that an object at a hyper-focal distance is in focus, and hence the photographing lens system can be focused on an object at any object distances from the hyper-focal distance to the infinite object distance.

Moreover, according to the present invention, if no effective object distance is obtained by the object distance measuring device, the depth-of-field can be further increased by reducing the diaphragm aperture, so that the hyper-focal distance can be shortened, whereby an object of a wider distance range can be made in-focus or a blurriness of the object image can be attenuated.

What is claimed is:

1. An automatic focusing apparatus of a camera comprising:
    a photographing lens having a focusing lens group;
    a diaphragm having an aperture formed therein for restricting an amount of light passing through said photographing lens;
    an autofocus system for obtaining an object distance to an object to be photographed through said photographing lens;
    a photometering system that receives light from an object to be photographed and calculates an appropriate exposure setting including an appropriate diaphragm value corresponding to an aperture size;
    a hyper-focal distance control system that, when said autofocus system fails to obtain said object distance, sets a corrected diaphragm value having an aperture size smaller than that of said appropriate diaphragm value by a predetermined step value, and sets a hyper-focal distance position of said photographing lens based on said corrected diaphragm value; and
    a focus controller for moving said focusing lens group to said hyper-focal distance position when said autofocus system fails to obtain said object distance.

2. An automatic focusing apparatus of a camera according to claim 1, wherein when an effective object distance is obtained by said autofocus system, said focus controller moves said focusing lens group of said photographing lens in accordance with said object distance thus obtained.

3. An automatic focusing apparatus of a camera according to claim 1, wherein said camera includes a photographing lens having at least two lens groups which relativity move towards each other or apart from each other allowing a variable focal length.

4. An automatic focusing apparatus of a camera according to claim 1, wherein said photographing lens further comprises a second lens group that is movable relative to said focusing lens group, the focal length of the photographing lens being changed by moving said focusing lens group and said second lens group relative to one another, and focusing is carried out by said focus controller moving said focusing lens group.

5. An automatic focusing apparatus of a camera according to claim 1, wherein said photographing lens is a zoom lens having a variable focal length, and wherein said hyper-focal distance control system sets said hyper-focal distance position based on both said corrected diaphragm value and said variable focal length of said zoom lens.

6. An automatic focusing apparatus of a camera according to claim 5, further comprising a focal length detector for detecting said variable focal length of said zoom lens and a diaphragm detector for detecting said corrected diaphragm value.

7. An automatic focusing apparatus of a camera according to claim 6, wherein said hyper-focal distance control system sets said hyper-focal distance position in accordance with both of said variable focal length detected by said focal length detector and said corrected diaphragm value detected by said diaphragm detector.

8. An automatic focusing apparatus of a camera according to claim 1, wherein said camera includes a digital image pickup on which said photographing lens forms an object image, said object image being converted to and recorded as electric digital image data.

9. An automatic focusing apparatus of a camera according to claim 1, wherein said focusing lens group of said photographing lens is placed in a default position at said hyper-focal distance position before said autofocus system obtains an object distance to an object to be photographed through said photographing lens, so that when said autofocus system fails to obtain said object distance, said focus controller does not move said focusing lens group.

10. An automatic focusing apparatus of a camera according to claim 1, wherein a said appropriate exposure setting calculated by said photometering system additionally includes an appropriate exposure time, and when said autofocus system fails to obtain said object distance, said hyper-focal distance control system sets a corrected exposure time longer than said appropriate exposure time by a predetermined step value.

11. An automatic focusing apparatus of a camera comprising:

a photographing lens having a focusing lens group;

an autofocus system for obtaining an object distance to an object to be photographed through said photographing lens;

a diaphragm having an aperture formed therein for restricting an amount of light passing through said photographing lens;

a photometering system that receives light from an object to be photographed and calculates an appropriate exposure setting including an appropriate diaphragm value corresponding to an aperture size;

a hyper-focal distance control system that sets a corrected diaphragm value having an aperture size smaller than said appropriate diaphragm value by a predetermined step value, and sets a hyper-focal distance position of said photographing lens based on said corrected diaphragm value; and a focus controller for moving said focusing lens group to said hyper-focal distance position.

12. An automatic focusing apparatus of a camera according to claim 11, wherein said appropriate exposure setting calculated by said photometering system additionally includes an appropriate exposure time and said hyper-focal distance control system sets a corrected exposure time longer than said appropriate exposure time by a predetermined step value.

13. An automatic focusing apparatus of a camera according to claim 11, wherein said a hyper-focal distance control system sets said corrected diaphragm value and sets said hyper-focal distance position of said photographing lens based on said corrected diaphragm value when said autofocus system fails to obtain said object distance.

14. An automatic focusing apparatus of a camera according to claim 13, wherein said focusing lens group of said photographing lens is placed in a default position at said hyper-focal distance position before said autofocus system obtains an object distance to an object to be photographed through said photographing lens, so that if said autofocus system fails to obtain an object distance, said focus controller does not move said focusing lens group.

15. An automatic focusing apparatus of a camera according to claim 11, wherein said photographing lens is a zoom lens having a variable focal length, and wherein said hyperfocal distance control system sets said corrected diaphragm value based on said corrected diaphragm value and said variable focal length of said zoom lens.

* * * * *